Patented Nov. 2, 1937

2,097,486

UNITED STATES PATENT OFFICE 2,097,486

FIRE EXTINGUISHING COMPOSITION

John A. Henricks, Jr., Chicago, Ill., assignor, by mesne assignments, to E. I. du Pont de Nemours & Company, Wilmington, Del., a corporation of Delaware No Drawing. Application June 29, 1934, Serial No. 732,995

6 Claims. (Cl. 23—11)

This invention relates to fire extinguishing compositions, and is particularly directed to fire extinguishing compositions which contain grain steep water solids as a foaming agent.

One frequently employed type of fire extinguishing composition is manufactured and sold as two separate liquids, or separate dry compositions which are dissolved in water for use. One portion contains a material of acid reaction such as an acid or acidulous salt, and the other portion contains a material which will cause an evolution of gas when contacted with the acid or acidulous salt. A carbonate is usually employed in the second portion. At the time of use the two portions are combined and the reaction mixture directed upon the flames which are to be extinguished.

I have found that the addition of a grain steep water to one or the other of the portions results in the formation of a foam which is very efficacious in extinguishing fires.

The exact chemical composition of steep water obtained from various grains is very complex and is at present unknown to me. Generally speaking, the steep waters contain mineral salts, organic phosphoric acids, nitrogenous substances (such as proteins), etc.

The steep waters of various grains are obtained by steeping the grains, at a relatively low temperature, with water which contains sulfur dioxide. Corn steep water, for instance, is made commercially by steeping corn kernels with water containing 0.25% to 0.30% sulfur dioxide at 115° to 125° F. for 30 to 40 hours. The water is circulated by means of a steam siphon. The dilute steep water obtained is concentrated to the desired degree by evaporation. I prefer about 60% solids in the concentrated steep water, tho I may continue the evaporation to obtain a dry product. It is noted that the steep waters do not contain starch as indicated by the iodine test.

A corn steep water made as discussed above is referred to by R. P. Walton in "A Comprehensive Survey of Starch Chemistry", Vol. 1 (1928) pg. 131. Walton says that "this water contains the salts, proteins and soluble carbohydrates which pass out through the covering membranes of the corn kernel". Walton gives the composition of one such batch of steep water as follows:

| | |
|---|---|
| Gravity_____degrees Baumé__ | 5.0 |
| Ash_____per cent__ | 20.0 |
| Protein_____per cent__ | 38.0 |
| Organic, not protein_____per cent__ | 49.0 |
| pH_____ | 4.0 |
| $SO_2$, free_____per cent__ | 0.03 |

For lack of better terminology I shall refer to the solution made as above, as "grain steep waters" regardless of concentration.

The following example illustrates the use of corn steep water in a two part fire extinguishing composition:

*Example.*—Two solutions were made up as follows:

A. 13% aqueous solution of aluminum sulfate. 3% corn steep water (60% steep water solids)

B. 8% aqueous solution of sodium bicarbonate.

The A and B solutions were brought together in a mixing nozzle and sprayed onto an alcohol blaze. An excellent foam was produced and the fire quickly extinguished.

I may, of course, use other acids and acidulous salts instead of aluminum sulfate. The sodium bicarbonate may be substituted with other carbonates, etc. These two-portion extinguishing compositions are already known to the art and it is unnecessary to enter into a detailed description of all of the various types, especially as my invention relates to the addition of steep water solids to such old compositions.

I preferably add the steep water solids to the acidic portion as the steep water solids are slightly acidic and as the acidic material of the extinguisher composition checks any tendency of the steep water solids to ferment.

While corn steep water has given by far the best results to date, I do not wish to be limited thereto as the steep water solids of various grains such as oats, barley, rice, wheat, etc., may be employed.

The steep water solids may be employed in other fire extinguishing compositions than the two-portion type above discussed. They will be found advantageous in any extinguishing composition wherein it is desired to produce a foam.

The steep water solids may be employed in water solution to make a so-called mechanical foam. In this application a water solution of steep water solids is violently agitated to make a foam. The foam is very useful as a fire exinguisher as it is substantially non-corrosive and is quite inexpensive.

While I have shown the use of 3% of steep water (based on 60% solids) I do not intend to be limited thereto. The quantity of steep water solids used may be widely varied, depending upon the specific solution to which the steep water is added, the nature and amount of foam desired, etc.

As is above noted, I may mix the steep water solids with dry preparations which are to be used as fire extinguishing compositions.

While I have set forth certain specific conditions and specific proportions, I do not intend to be restricted thereby, the scope of my invention being set forth in the appended claims.

I claim:

1. In a process of extinguishing a fire the step comprising directing thereupon a foam which comprises grain steep water solids.

2. In a process of extinguishing a fire the step comprising directing thereupon a foam which comprises corn steep water solids.

3. A component of a foaming fire extinguishing composition comprising a grain steep water and a gas producing material, the said component being adapted to produce a foaming fire extinguishing composition when admixed with a second component which will react with said components to generate a gas.

4. A component of a foaming fire extinguishing composition comprising corn steep water and a gas producing material, the said component being adapted to produce a foaming fire extinguishing composition when admixed with a second component which will react with said components to generate a gas.

5. A fire extinguisher charge comprising a solution containing grain steep water and a second component selected from the group consisting of acid or basic materials which on being admixed with a material of opposing characteristics will cause the generation of a gas.

6. A fire extinguisher charge comprising a solution containing corn steep water and a second component selected from the group consisting of acid or basic materials which on being admixed with a material of opposing characteristic will cause the generation of a gas.

JOHN A. HENRICKS, Jr.